United States Patent Office 3,041,260
Patented June 26, 1962

3,041,260
NUCLEAR FUEL MATERIAL
Walter V. Goeddel, San Diego, Calif., assignor, by mesne assignments, to the United States of America as represented by the United States Atomic Energy Commission
No Drawing. Filed Dec. 31, 1958, Ser. No. 784,065
9 Claims. (Cl. 204—154.2)

The present invention relates generally to the production of nuclear fuel material. More particularly, the invention relates to the production of the carbides of such materials, the invention having special application to the production of the carbides of uranium, thorium, and plutonium or the mixed carbides of those metals.

In a reactor which is to be operated at a relatively high operating temperature and wherein it is desired to obtain a relatively high "burn up" (i.e., a high utilization of the energy within the fuel), it has been found desirable to employ the carbides of the nuclear fuels since the carbides are quite stable at high temperatures and are compatible with carbon and graphite even at operating temperatures in excess of 2000° C. which may be reached within the fuel body in a high temperature reactor system. Further, in connection with a high temperature reactor, it may be desirable to employ mixtures of fissile and fertile materials such as mixtures or solid solutions of uranium —235 and thorium carbides. Use of the carbides, however, as a reactor fuel has not been considered entirely practical since the carbides of fissile and fertile materials are extremely reactive in moist air and consequently are extremely difficult to fabricate into a fuel body or fuel compact. Moreover, those carbides, when prepared by arc melting, the most practical known method, are extremely difficult to crush into particles of the desired size range and consequently it is difficult to produce a fuel body having uniform activity and heat dissipating properties.

Accordingly, it is the principal object of this invention to provide an improved method of making the carbides of nuclear fuel materials which will obviate or minimize known difficulties. It is a further object of the invention to provide an improved method of making uranium, thorium, and plutonium carbides or mixtures thereof which will obviate or minimize known difficulties.

It is also an object of the invention to provide particles of the carbides of fissile and fertile materials or combinations thereof having reduced surface reactivity so that these carbides may be more readily fabricated into a fuel body or compact.

Another object of the invention is the provision of particles of carbides of fissile and/or fertile materials which may readily be prepared in the proper size range for optimum use in a fuel body or compact.

It is also a specific object of the invention to provide uranium and thorium carbides, or mixtures thereof, whose surface reactivity is reduced, which may be readily produced in the desired size range, and which may be readily fabricated into a fuel body or compact. It is a more specific object of the invention to provide an improved method of making uranium, thorium and plutonium carbides without the formation of gaseous by-products.

Other objects and advantages of the invention will become known from the following description of the invention.

Basically, a process in accordance with the invention makes possible the production of the carbides of the fuel material which may include fissile and/or fertile materials by the employment of a method which involves a number of steps which cooperate to produce a highly improved carbide. Fissile materials which may be employed as fuel materials include uranium —235, uranium —233, and plutonium —239. Fertile materials may comprise uranium —238 or thorium 232.

In accordance with the invention, the metal of the fuel material is transformed into a silicide after which the silicide is comminuted to the desired degree. The silicide of the fuel material is then carburized at an elevated temperature either above or below the melting point of the silicide to produce an intimate mixture of the carbide of the fuel material and the carbide of silicon.

It has been discovered that when the foregoing method is employed, the resulting combination of the fuel material carbide and silicon carbide is relatively stable in the presence of moisture and does not exhibit the highly reactive surface condition which is observed with uranium carbides made by known methods. The exact reason for the reduced surface activity is not entirely clear. However, it is believed that the silicon carbide migrates to the surface of the particles so that a sufficient concentration of silicon carbide is adjacent the surface of the particle to inhibit the reactivity of the surface of the particle. It has been found, also, that the particles made in accordance with the invention, despite their reduced surface reactivity, can be fabricated into and provide a highly efficient fuel element for a reactor core.

As has been pointed out, the fuel material may comprise fissile material, or a mixture of fissile and fertile material. Assuming that the fissile material is to be uranium —235, the following description will disclose one preferred method of making uranium —235 carbide for use as a reactor fuel. First, the uranium —235 and silicon are mixed in the desired proportions to produce uranium silicide. This mixture is combined by arc melting to produce uranium silicide, an intermediate compound which, when cooled, becomes a brittle mass. While the relative proportions of uranium and silicon can vary widely, the preferred amount of silicon in making the silicide amounts to about 0.6 percent by weight. The resulting uranium silicide is then crushed to the desired size range. The size range which has been found particularly satisfactory for use as a reactor fuel has ranged between about 100 and 500 microns.

The crushed uranium silicide is then carburized. Carburization is accomplished by heating the silicide to a carburizing temperature. The carburizing temperature is at least about 800° C. but at that temperature carburization proceeds quite slowly. Therefore, temperatures of about 1600° C. or above are preferred. The carburization may be carried out in an atmosphere of hydrogen and methane or any other suitable reducing atmosphere containing a hydrocarbon. The carburization is carried on for a sufficient time to cause the uranium silicide to become converted to uranium carbide and silicon carbide. The resulting mixture of carbides, when cooled, is in particulate form and may then be mixed with graphite and/or carbon and other materials to form a fuel compact by any of the known methods.

Carburization may also be accomplished by mixing the crushed uranium silicide with an excess of comminuted graphite or carbon, which mixture may be heated to above about 1600° C. in a reducing atmosphere to effect the conversion of the uranium silicide and to thereby produce a combination of uranium and silicon carbides. When this method is employed and the mass is cooled, a matrix of graphite or carbon and the silicon and uranium carbides is produced. However, this matrix may readily be crushed to the desired size for use in fabricating fuel bodies or compacts.

By either method of carburization, the resulting particles containing carbides of uranium and silicon exhibit inhibited surface reactivity in the presence of moist air. The particles may be fabricated into fuel compacts and these compacts, too, exhibit greatly reduced reactivity in the presence of moist air or other troublesome conditions.

One preferred procedure which may be employed to provide a fuel compact comprises the intermixing of the desired amounts of particulated carbon, the silicides of the nuclear fuel material and a suitable binder. For example, the silicide of uranium may be mixed with the proper amount of carbon and a binder to produce a fuel compact and this mixture may be heated to carburizing temperatures under pressure to produce a fuel compact of the desired dimensions. When this procedure is employed, the carburization of the silicide does not result in the evolution of gas and therefore it becomes possible to minimize pore formation in the fuel compact. This results in a highly non-porous fuel compact which tends to minimize the migration of diffusible and volatile fission products. Moreover, the fuel compact exhibits a marked reduction of activity in the presence of moist air.

The exact mechanism by which the reduction in surface reactivity occurs is not entirely clear, as has been pointed out above. Apparently, however, the resulting particles comprise mixtures or solid solutions of the uranium and silicon carbides and apparently the silicon carbide tends to migrate to the surface of these particles to produce an inhibiting region on the surface thereof. In any event, the particles exhibit quite stable surface characteristics.

The thorium carbide may be prepared in exactly the same method as is described above for the preparation of uranium carbide. Again, the resulting thorium carbide exhibits a surface stability which has heretofore been unknown.

A mixture of thorium and uranium −235 carbides may also be prepared in the same manner. In this method, the uranium and thorium in the desired proportions, depending upon the requirements of the reactor system with which the fuel element is to be employed, are mixed in the desired amounts with an equivalent amount of silicon and the mixture is arc melted to produce mixed uranium and thorium silicides. This mixture is then crushed to the desired size range, which may be in the range of 100 to 500 microns, after which the crushed, mixed silicides are carburized by either of the methods which have been described above in connection with the uranium silicide. Again, the mixed carbides exhibit the inhibited surface characteristics which have been observed with the carbides of uranium and of thorium.

In a similar manner the carbide of plutonium or of a mixture of plutonium and thorium may be produced.

The procedure of the present invention provides a highly improved method of making particles of carbides of fissile and fertile materials for use in a nuclear fuel body. Previously, the carbides have been made by arc melting and the resulting carbide has been quite difficult to crush to the desired size range for use in making a fuel body or compact. Also, the particles are highly reactive to moist air and cannot be handled under normal fabricating conditions. When the procedure of the present invention is employed, the silicide prepared in the first step of the process is brittle and may be readily crushed to the desired size range. The resulting carbide particles are of the proper size for use, or a matrix of these particles may be readily broken down to the proper particle size. Moreover, as has been pointed out above, these improved particles may be readily fabricated into fuel compacts by the usual operations.

Further, when the process of the invention is employed in making a fuel compact wherein the silicide is converted to the carbides in situ, gas production is minimized and this results in the production of a fuel body of reduced porosity.

Various features of the invention which are believed new are expressly set forth in the appended claims.

I claim:

1. A method of making the carbide of a nuclear fuel material selected from the group consisting of uranium, plutonium, thorium and mixtures thereof comprising the steps of producing the silicide of said fuel material in the form of particles having a size range between about 100 and 500 microns, carburizing said fuel material by heating to a temperature high enough to at least initiate a carburizing reaction to produce an intimate mixture of the carbides of said fuel material and silicon, whereby the silicon carbide acts to reduce the surface reactivity of the nuclear fuel carbide.

2. A method of making the carbide of a nuclear fuel material selected from the group consisting of uranium, plutonium, thorium and mixtures thereof for use in a nuclear reactor comprising the steps of producing the silicide of said fuel material, comminuting the silicide of said fuel material to a particle size in the range between about 100 and 500 microns, carburizing said comminuted fuel material by heating to a temperature high enough to at least initiate and maintain the carburizing reaction to completion, whereby there is produced an intimate mixture of the carbides of said fuel material and silicon, the silicon carbide acting to reduce the surface reactivity of the nuclear fuel carbide.

3. A method for making the carbide of a nuclear fuel material selected from the group consisting of uranium, plutonium, thorium and mixtures thereof for use in a neutronic reactor comprising the steps of producing the silicide of said fuel material, comminuting the silicide of said fuel material to a particle size in the range between 100 and 500 microns, carburizing the finely divided silicide of said fuel material at a temperature above at least $800°$ C. to produce an intimate mixture of the carbides of said fuel material and silicon, wherein the silicon carbide acts to reduce the surface reactivity of the nuclear fuel carbide.

4. A method of making the carbide of a nuclear fuel material selected from the group consisting of uranium, plutonium, thorium and mixtures thereof for use in a neutronic reactor comprising the steps of producing the silicide of said fuel material, comminuting the silicide of said fuel material to a size range between about 100 to 500 microns, carburizing the finely divided silicide of said fuel material to a temperature at least as high as about $1600°$ C. to produce an intimate mixture of the carbides of said fuel material and silicon, wherein the silicon carbide acts to reduce the surface reactivity of the nuclear fuel carbide.

5. A method of making the carbide of a nuclear fuel material selected from the group consisting of uranium, plutonium, thorium and mixtures thereof for use in a neutronic reactor comprising the steps of producing the silicide of said fuel material, comminuting the silicide of said fuel material to a size range between about 100 to 500 microns, carburizing the finely divided silicide of said fuel material at a temperature above at least about $1600°$ C. in an atmosphere consisting of hydrogen and a hydrocarbon to produce an intimate mixture of the carbides of said fuel material and silicon in particulate form, wherein the silicon carbide acts to reduce the surface reactivity of the nuclear fuel carbide.

6. A method of making the carbide of a nuclear fuel material selected from the group consisting of uranium, plutonium, thorium and mixtures thereof for use in a neutronic reactor comprising the steps of producing the silicide of said fuel material, comminuting the silicide of said fuel material to a size range between about 100 to 500 microns, carburizing the finely divided silicide of said fuel material at a temperature above at least about $1600°$ C. in a hydrogen atmosphere in the presence of an excess of comminuted carbon to produce an intimate mixture of the carbides of said fuel material and silicon, wherein the silicon carbide acts to reduce the surface reactivity of the nuclear fuel carbide.

7. A method of making the carbide of a nuclear fuel material selected from the group consisting of uranium alone and uranium admixed with thorium for use in a nuclear reactor comprising the steps of admixing said metal with about 0.6 by weight silicon, arc melting said admixture to produce the silicide of said fuel material, comminuting the silicide of said fuel material to a size range between about 100 and 500 microns, carburizing the finely divided silicide of said fuel material at a temperature above at least about 1600° C. in a hydrogen atmosphere in the presence of an excess of comminuted carbon intimately mixed therewith to produce an intimate mixture of the carbides of said fuel material and silicon, wherein the silicon carbide acts to reduce the surface reactivity of the nuclear fuel carbide.

8. A method of making the carbide of a nuclear fuel material selected from the group consisting of uranium alone and uranium admixed with thorium for use in a nuclear reactor comprising the steps of admixing said metal with about 0.6 by weight silicon, arc melting said admixture to produce the silicide of said fuel material, comminuting the silicide of said fuel material to a size range between about 100 and 500 microns, carburizing the finely divided silicide of said fuel material at a temperature above at least about 1600° C. in a hydrogen atmosphere containing methane gas to produce an intimate mixture of the carbides of said fuel material and silicon, wherein the silicon carbide acts to reduce the surface reactivity of the nuclear fuel carbide.

9. A method of making the carbide of a nuclear fuel material selected from the group consisting of uranium alone and uranium admixed with thorium for use in a nuclear reactor comprising the steps of admixing said metal with about 0.6 by weight silicon, arc melting said admixture to produce the silicide of said fuel material, comminuting the silicide of said fuel material to a size range between about 100 and 500 microns, admixing comminuted carbon with said silicide of said fuel material, forming a fuel compact from said admixture of carbon and said silicide of said fuel material, carburizing said fuel compact at a temperature above about 1600° C. in a hydrogen atmosphere to produce an intimate mixture of carbon and the carbides of said fuel material and silicon, wherein the silicon carbide acts to reduce the surface reactivity of the nuclear fuel carbide.

References Cited in the file of this patent
UNITED STATES PATENTS

| 869,013 | McQuat | Oct. 22, 1907 |
|---|---|---|
| 1,038,827 | Becket | Sept. 17, 1912 |
| 1,098,794 | Fleming | June 2, 1914 |
| 2,814,857 | Duckworth | Dec. 3, 1957 |

FOREIGN PATENTS

| 754,559 | Great Britain | Aug. 8, 1956 |
|---|---|---|

OTHER REFERENCES

Nuclear Fuels, 1956, pp. 252–253, Beckerly, Gen. Editor, published by D. Van Nostrand Co., Inc., Princeton, N.J.

WAPD–PWR–PMM–601, Losco and Belle, Feb. 1, 1956, pg. 5, available from OTS, Dept. of Comm., Wash. 25, D.C., price 40 cents.